UNITED STATES PATENT OFFICE.

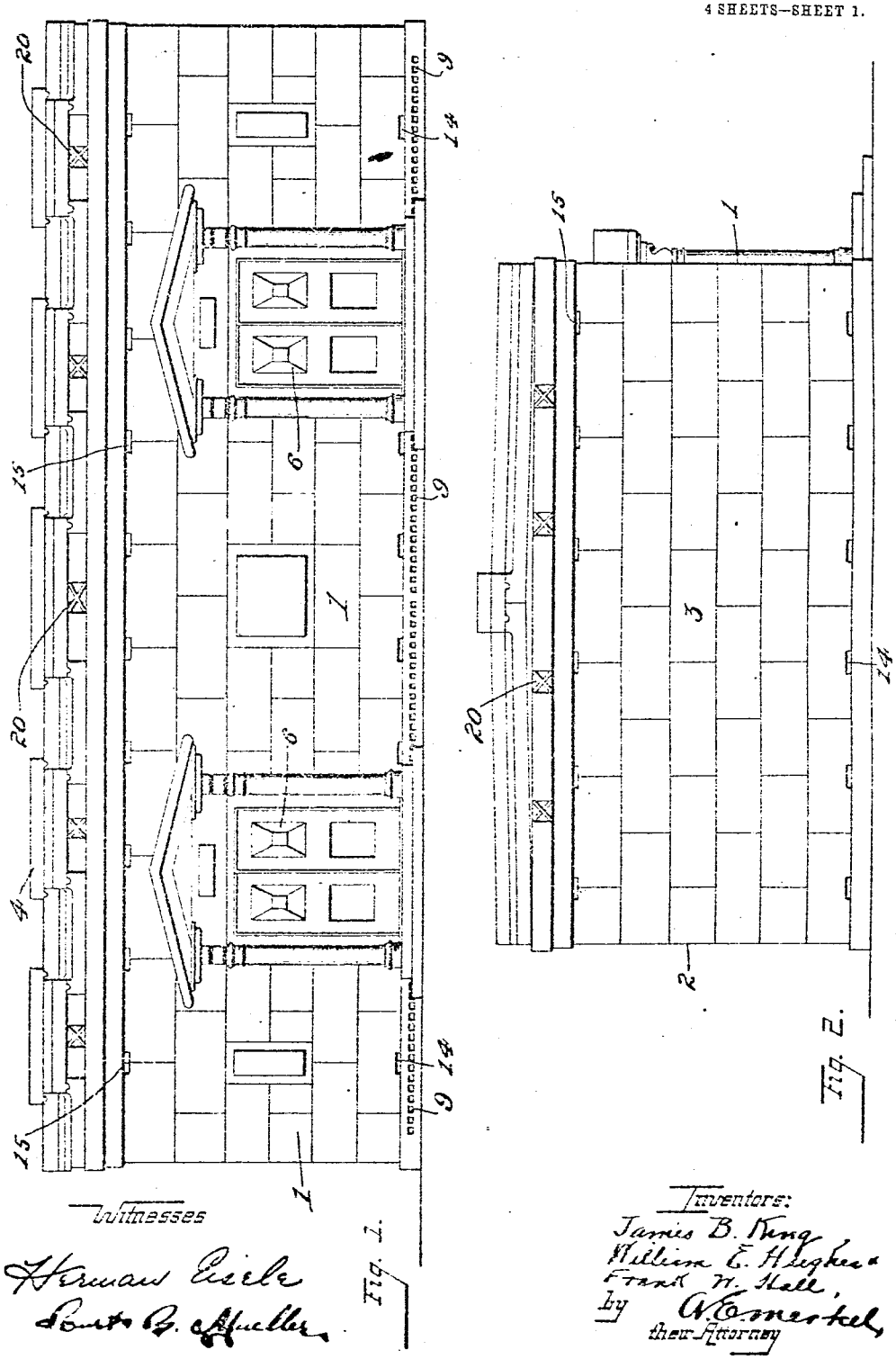

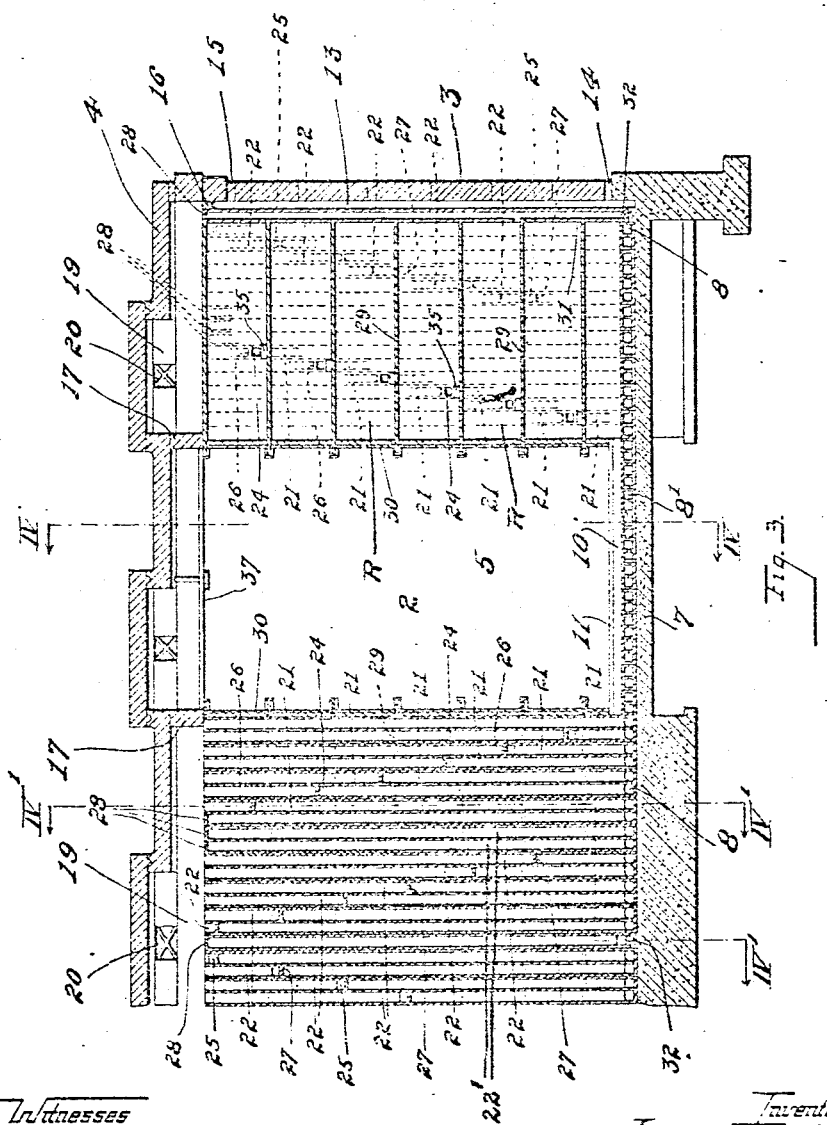

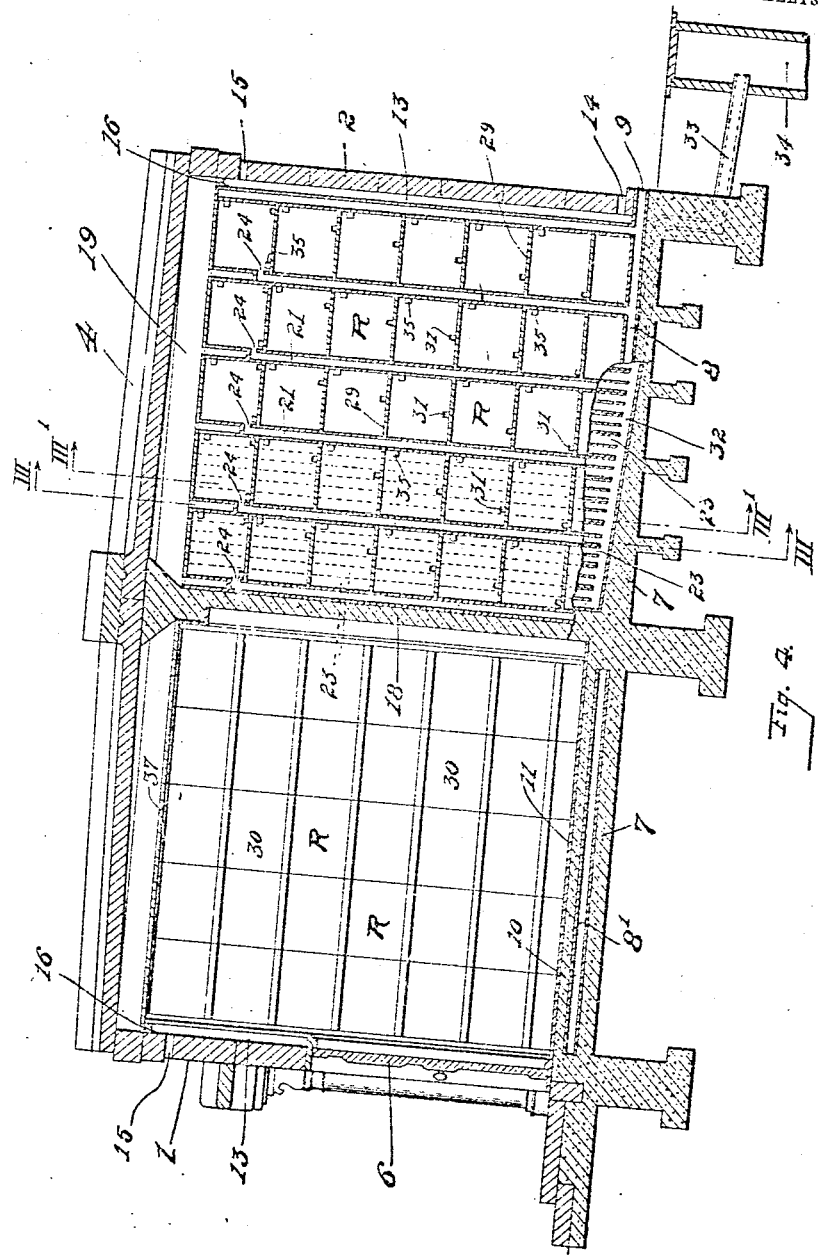

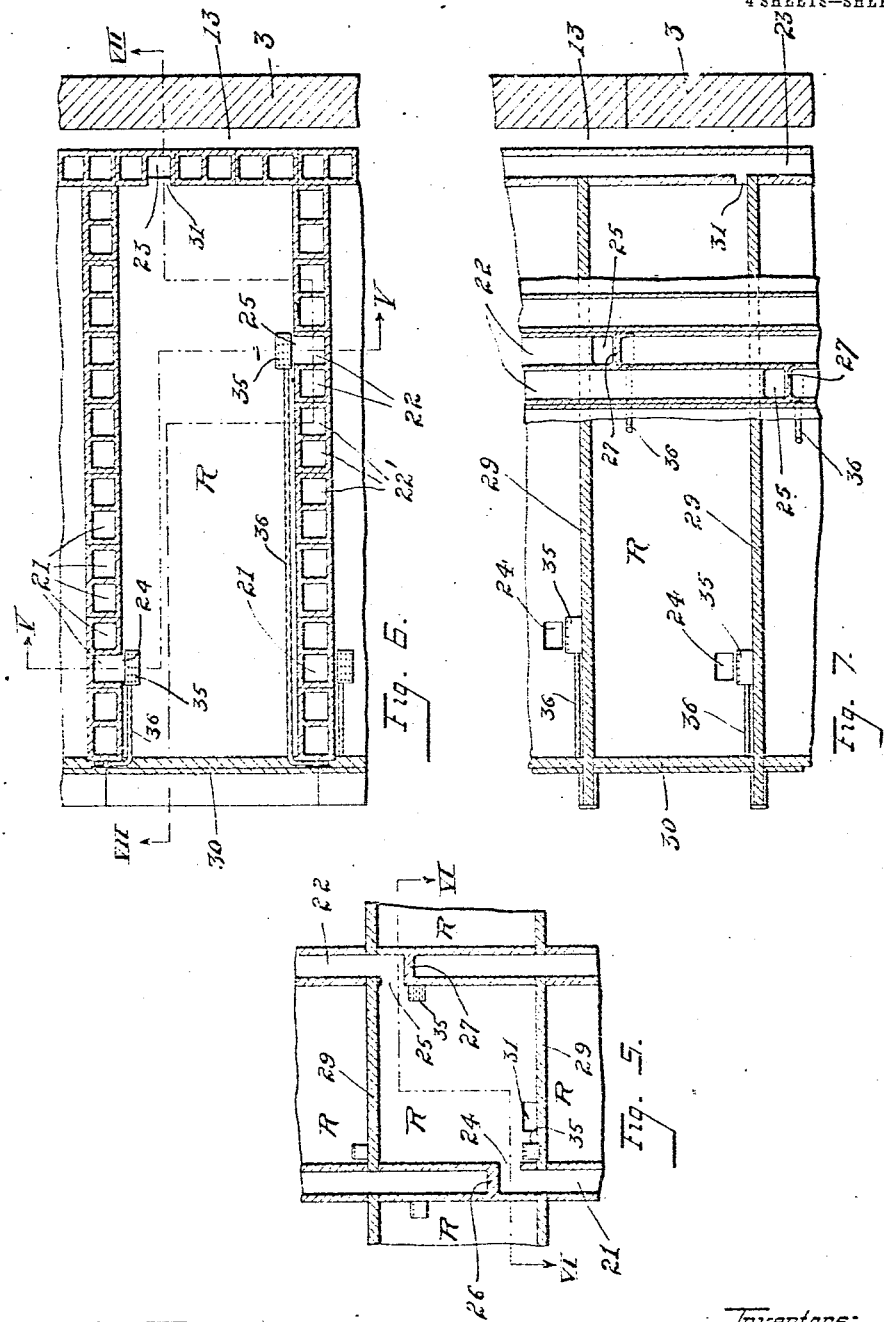

JAMES B. KING AND WILLIAM E. HUGHES, OF CLYDE, OHIO, AND FRANK W. HALL, OF DETROIT, MICHIGAN.

MAUSOLEUM.

949,771.  Specification of Letters Patent.  Patented Feb. 22, 1910.

Application filed January 11, 1910. Serial No. 537,380.

*To all whom it may concern:*

Be it known that we, JAMES B. KING and WILLIAM E. HUGHES, of Clyde, county of Sandusky, and State of Ohio, and FRANK W. HALL, of Detroit, county of Wayne, and State of Michigan, citizens of the United States, have invented a new and useful Improvement in Mausoleums, of which the following is a specification, the principle of the invention being herein explained, and the best mode in which we have contemplated applying that principle so as to distinguish it from other inventions.

Our invention relates to mausoleums which are provided for the reception of a plurality of bodies, its object being to provide a construction of the above-named character which will combine to the greatest degree economy and permanence of construction with a minimum of maintenance and care. This object involves, furthermore, the elimination of moisture which tends to form by condensation upon the walls of structures of this character, and also the ventilation of the interiors of the individual receiving crypts, whereby putrefaction of the bodies is prevented and desiccation substituted therefor.

It is a well-known bacteriological fact that bacteria require moisture for their propagation and the greater the degree of elimination of moisture, the greater the reduction of the incentive to such propagation. It is further well-known that the unsanitary results of the putrefaction of nitrogenous matter, such as is included in the human structure, result from this bacteriological propagation, and the elimination of the latter will, therefore, eliminate these unsanitary and obnoxious results.

Our invention consists of means hereinafter fully described and particularly set forth in the claims.

The annexed drawings and the following description set forth in detail certain means embodying our invention, the disclosed means, however, constituting but one of the various mechanical forms in which the principle of our invention may be supplied.

In the annexed drawings:—Figure 1 is a front elevation of a mausoleum constructed in accordance with our invention. Fig. 2 is an end elevation thereof. Fig. 3 is a fragmentary vertical transverse section, taken upon the planes indicated by lines III—III and III'—III', Fig. 4. Fig. 4 is a vertical longitudinal section through same, one-half of the section being taken upon a plane indicated by line IV—IV, Fig. 3, and the other half being taken upon the planes indicated by lines IV'—IV' in said figure. Fig. 5 is an enlarged vertical detail longitudinal section through a number of adjacently located crypts taken upon the planes indicated by lines V—V Fig. 6. Fig. 6 is a horizontal section, upon an enlarged scale, of one of the crypts and adjacent parts taken upon the planes indicated by lines VI—VI, Fig. 5. Fig. 7 is a vertical transverse section of one of the crypts and adjacent parts taken upon the planes indicated by lines VII—VII. Fig. 6.

Similar letters and numerals of reference in the specification refer to similar parts in the several figures of the drawings.

The general structure of the mausoleum embodying our invention includes a front wall 1, a rear wall 2, side walls 3, and a roof 4. Interiorly the structure is provided with one or more parallel lobbies or corridors 5 with which suitable doors 6 in one or both ends of the structure communicate.

A suitable foundation or bed 7, of concrete or other suitable material is provided and forms a support for a horizontal bed of hollow tiles, which extend under the receiving crypts R longitudinally of the building transversely of such crypts, and form horizontal passages 8, which also act as air spaces as will be hereinafter further described. Tiers of such crypts, forming superimposed rows and laterally adjacent columns thereof, are built over the bed of tiles, as is illustrated in Fig. 3. These passages are open at one end to the atmosphere, permitting the latter to freely enter, as will be further described, such communication being shown at 9, Fig. 4. The passages 8' formed by the hollow tiles beneath the lobby of the building may be left open at both ends so as to afford a free passage of the air beneath said floor from end to end of the building, as shown in Fig. 1, or may be closed at such ends, as shown in Fig. 4. The lobby floor is preferably formed by laying a bed of concrete or other suitable material 10 upon the hollow tiles and then providing the same with a suitable facing 11.

The sides and rear ends of the receiving crypts are formed of hollow tiles built so as to form vertical passages, as will be hereinafter more fully described, and the tiles forming the backs of all of the receiving crypts and the tiles forming the front sides and rear sides respectively of the end columns of receiving crypts are removed a distance from the adjacent walls so as to form intervening vertical air-spaces 13, Figs. 3 and 4, connected with the atmosphere near the bottom by openings 14 and near the top by openings 15, the extreme top of such spaces being closed by suitable masonry 16. Air may therefore circulate through these air-spaces by entering the openings 14 and emerging from the openings 15, thereby effectually preventing condensation and therefore the accumulation of undesirable moisture upon the corresponding interior walls of the structure, as will be readily understood.

The roof of the building is supported laterally by the side walls 3 and intermediately of such walls by longitudinally placed members 17 which may be caused to rest upon the tops of the columns of the receiving crypts. A central partition or wall 18 is provided in the illustrated structure which supports the roof transversely, the latter being of any suitable construction. This roof is caused to be located a distance above the crypt portion of the structure so as to provide air-spaces 19 above the latter, members 17 cutting off communication between said air-spaces and the lobbies. These air-spaces communicate with the atmosphere by means of vents 20 formed in the front, rear and side walls of the building, as shown in Figs. 1 and 2.

The tiles forming the sides and back of the crypts are placed vertically upon each other so as to form vertical inlet passages 21 and outlet passages 22 between adjacent columns of crypts and vertical drain-passages 23 back of the crypts. Each of said crypts is provided with an inlet-opening 24 and an outlet-opening 25. These inlet and outlet-openings are formed upon opposite sides of the interior of the crypts, the inlet-opening being placed near the bottom and toward the front thereof, and the outlet-opening being placed near the top and near the rear thereof, as is shown in Fig. 7. Each inlet-opening is connected with a vertical inlet passage 21 and this passage is stopped, as at 26, immediately above such inlet-opening, as shown in Fig. 5. The lower end of each inlet-passage connects with one of the longitudinal and horizontal air-passages 8, as is illustrated in Fig. 3. It will therefore be seen that the interior of each receptacle communicates with the atmosphere through these vertical air-passages, and the air passages or spaces 8, at a point below its interior.

Each outlet-opening 25 communicates with a vertical outlet passage 22 and this passage is stopped as at 27, Fig. 5, immediately below such opening. The upper ends of these vertical outlet passages communicate directly with the air-spaces 19, and these latter communicating, as before described, with the atmosphere, it will be seen that communication between the latter and the interior of the receptacles is established.

All vertical passages, such as 22', which do not form outlet passages, are closed at the top by stops 28, Fig. 3, and the bottoms of such vertical passages connect with horizontal passages 8, so that any condensed moisture which may form in these last-named passages may drain down into such horizontal passages. It will therefore be seen that by means of the above-described construction, the interior of each receptacle is connected with the atmosphere at a point below such interior by means of an air space consisting of one of the passages 8 and a duct consisting of one of the inlet passages 21, and also at a point above such interior, by means of a duct consisting of one of the outlet passages 22 and an air-space 19, the inlet and outlet-ducts or passages forming the sole communication between the lower air-spaces 8 formed by the tiles and the upper air-spaces 19. All inlet passages and outlet passages being stopped as before described and passages 22 being closed at the top, it will therefore be seen that all of the air which circulates from the bottom upwardly must pass through the crypts and the interior of each of the latter is furthermore provided with an individual ventilating system which is independent of and disconnected from the interior of all of the other receptacles.

As previously described, the vertical air-spaces 13 adjacent to the outer walls are stopped, as at 16, so that the circulation of air therethrough will not interfere with the above-described arrangement for causing all of the air circulating through the crypt construction to circulate through the interiors of receptacles.

The bottoms of the respective receptacles are formed by horizontal slabs 29, which are supported by the tiles, as is shown in Fig. 7. The front end of each receiving crypt is closed by means of a suitable slab 30. In the rear end of each crypt is formed an opening 31, each of which is connected with a vertical passage 23 formed by the tiles which form the rear ends of the receptacles. These openings are placed so that their lower extremities will be flush with or be intersected by the plane of the floor so that they may receive any fluid formed or present in the interior of the receptacles. The lower ends of these vertical fluid drains 23 communicate with a common longitudinally arranged duct 32, shown in Fig. 4, which in turn connects with a drain pipe 33, discharging into a septic tank 34 located at any convenient point below the surface or below the level of the passage 32.

Immediately adjacent to and below each inlet and outlet-opening 24 and 25, there is placed a vessel 35 containing a disinfecting material, preferably a volatile fluid such as formaldehyde, as is shown in Fig. 5. From each receptacle and leading outwardly through the front thereof is a tube 36 by means of which such fluid may be supplied to such receptacle from the exterior whenever desired, suitable caps (not shown) being placed over the outer ends of these tubes after the fluid has been supplied, as will be readily understood. By means of these disinfecting devices the air passing into the interior of the crypts is laden with disinfecting vapor, which vapor is carried through such interior, after which it passes again over a disinfecting device, which adds its vapor to that already contained in the air. Disease germs present in the crypts are thus effectually exterminated.

It will be noted that by locating the inlet and outlet-openings as above described, the ventilating and disinfecting fluids are carried through the crypts over the longest possible distances, so as to subject the body and the crypt interior to the ventilating, desiccating and disinfecting action thereof to the greatest possible extent.

If desired, the ceiling 37 may be provided for the corridors, which may be supported from the roof by means of suitable hangers 38, as is shown in Fig. 3.

Having fully described our invention, what we claim therefore and desire to secure by Letters Patent is:—

1. In a mausoleum, the combination of an inclosed receiving crypt provided with an outlet-opening and an inlet-opening; an upper air-space communicating with the atmosphere; a lower air-space communicating with the atmosphere; and ducts connecting respectively with said inlet and outlet-openings and forming the sole communication between said upper and lower air-spaces, whereby a natural draft is formed.

2. In a mausoleum, the combination of an inclosed receiving crypt provided with an outlet-opening and an inlet-opening, said inlet-opening being located on one side of the crypt and the outlet-opening being located in the opposite side of said crypt, the said outlet-opening being further located in a horizontal plane above the horizontal plane of the inlet-opening; a duct connecting such inlet-opening with the atmosphere, at a point below said crypt, and a duct connecting the outlet-opening with the atmosphere at a point above said crypt, whereby a natural draft is formed.

3. In a mausoleum, the combination of an inclosed receiving crypt provided with an outlet-opening and an inlet-opening, said two openings communicating with the interior of such crypt at opposite sides respectively of the latter, the outlet-opening being located in a plane above the plane of the inlet-opening; an upper air-space; and a lower air-space; and air passages connected with said openings; said air-spaces being connected respectively with the ends of said passages, the latter and said crypts affording the only communication between said air-spaces, whereby a natural draft is formed.

4. In a mausoleum, the combination of an inclosed receiving crypt provided with an outlet and an inlet-opening, said two openings communicating with the interior of said crypt at opposite sides respectively of the latter, the said outlet-opening being located in a horizontal plane above the horizontal plane of said inlet-opening, said openings being furthermore located in transverse vertical planes materially distant from each other in the longitudinal direction of the crypt; a duct connecting the outlet-opening with the atmosphere at a point above such crypt; and a duct connecting the inlet-opening with the atmosphere at a point below such crypt, whereby a natural draft is formed.

5. In a mausoleum, the combination of an inclosed receiving crypt provided with an outlet and an inlet-opening, said two openings communicating with the interior of said crypt at opposite sides respectively of the latter, the said outlet-opening being located in a horizontal plane above the horizontal plane of such inlet-opening, said openings being furthermore located in transverse vertical planes materially distant from each other in the longitudinal direction of the crypt; an upper air-space; a lower air-space; an air-passage connecting the outlet-opening with the upper air-space; and an air passage connecting the inlet-opening with the lower air-space; said two air-spaces communicating with the atmosphere respectively; said air-passages and crypts affording the sole communication between said air-spaces, whereby a natural draft is formed.

6. In a mausoleum, the combination of an inclosed receiving crypt provided with an outlet-opening and an inlet-opening; a duct connecting such inlet-opening with the atmosphere; and a duct connecting the outlet-opening with the atmosphere; the point of communication of the first-named duct with the atmosphere being below the receiving crypt, and the point of communication with the atmosphere of the duct connecting with the outlet-opening being above such crypt; said two ducts affording the sole communication of the interior of the crypt with the atmosphere, whereby a natural draft is formed.

7. In a mausoleum, the combination of a plurality of inclosed receiving-crypts, each provided with an outlet-opening and an inlet-opening; an upper air-space; a plurality of air-passages respectively connecting said outlet-openings with said upper air-space; and a plurality of ducts each connecting each inlet-opening with the atmosphere at a point below its corresponding crypt; said ducts, air-passages and said upper air-space forming the sole passage affording communication between said crypts and the atmosphere, whereby a natural draft is formed.

8. In a mausoleum, the combination of a plurality of horizontal parallel air-passages communicating with the atmosphere; a plurality of inclosed receiving crypts arranged in tiers and spaced transversely with respect to said passages, each crypt provided with an inlet and an outlet-opening; a plurality of vertical passages each communicating at its lower end with one of said horizontal passages, the upper end of each such vertical passage communicating with one of the inlet-openings in said crypts; a second series of vertical passages each having its lower end connected with one of the outlet-openings of said crypts, and having its upper end communicating with the atmosphere; said passages forming the sole communication between the interior of said crypts and the atmosphere, whereby a natural draft is formed.

9. In a mausoleum, the combination of a floor embodying in its structure hollow tiles forming a plurality of horizontal passages communicating at their outer ends with the atmosphere; vertical walls formed of hollow tiles and forming a plurality of vertical passages each communicating at its lower end with a horizontal passage and forming the sides of receiving crypts; horizontally disposed members forming the top and bottom of such receiving crypt; end walls forming the back of said crypt; each crypt provided with an inlet-opening and an outlet-opening, each inlet-opening communicating with a vertical passage on one side of such crypt, and each outlet-opening communicating with a vertical passage on the other side of such crypt; each outlet-opening being located in a plane above the plane of the inlet-opening of the corresponding crypt, whereby a natural draft is formed.

10. In a mausoleum, the combination of a floor provided with a plurality of horizontal passages each connected with the atmosphere; a plurality of superimposed inclosed receiving crypts each provided with an inlet and an outlet-opening; a plurality of vertically disposed passages connecting said horizontal passages with the inlet-openings of said crypts respectively; a roof forming an air-space above the crypts, and a plurality of upright passages connecting said outlet-openings with said air-space, the latter communicating directly with the atmosphere, whereby a natural draft is formed.

11. In a mausoleum, the combination of a plurality of horizontally disposed passages each communicating with the atmosphere; a plurality of superimposed inclosed receiving crypts each provided with an inlet-opening and an outlet opening; a plurality of vertically disposed passages connecting the said horizontally disposed passages with said inlet-openings respectively; a roof forming an air-space above said crypts, a plurality of vertically disposed passages connecting said outlet-openings with said air-space; said inlet-openings communicating with the interior of the respective crypts in a plane below the point of communication of said outlet-openings with such crypts respectively; said air-space communicating directly with the atmosphere, whereby a natural draft is formed.

12. In a mausoleum, the combination of a plurality of tiers of inclosed receiving crypts, each provided with an inlet and an outlet opening; vertical air passages between adjacent columns of crypts and communicating at their lower ends with the atmosphere and closed to such communication at their upper ends; additional vertical air-passages communicating at their lower ends with the atmosphere and at their upper ends with said inlet-openings respectively; and further additional vertical air-passages communicating at their lower ends with said outlet-openings respectively and at their upper ends with the atmosphere, whereby a natural draft is formed.

13. In a mausoleum, the combination of a plurality of tiers of inclosed receiving crypts, each provided with an air-inlet and an air-outlet; a plurality of horizontally disposed and parallel air-passages located beneath and transversely of said crypts, and communicating with the atmosphere; a plurality of vertical air-passages each having its lower end communicating respectively with the other of said horizontal passages and having its upper end closed, said air-passages being located between adjacent columns of crypts; additional vertical air-passages between such columns each having its lower end communicating with one of said horizontal air passages and its upper end connecting with one of said air-inlets; further additional vertical air-passages between said columns each having its lower end connected with one of said outlet-openings and its upper end communicating with the atmosphere, whereby a natural draft is formed.

14. In a mausoleum, the combination of a suitable floor embodying in its structure hollow tiles forming horizontal passages communicating at the outer ends with the atmosphere; a series of superposed rows of inclosed receiving crypts supported on said floor and formed of hollow tiles, and having their sides and ends formed of hollow tiles, and providing vertical passages laterally between the crypts, part of which communicate with said horizontal passages; a roof over said crypts and forming an air-space above the latter, another part of said vertical passages communicating with said air-space and the latter communicating with the atmosphere; the bottoms and tops of said compartments being formed by horizontal slabs supported by said tiles.

15. In a mausoleum, the combination of an inclosed compartment provided with an air-opening; a disinfecting apparatus located adjacent to such opening; and means for supplying disinfectant to said apparatus from the exterior of the compartment.

16. In a mausoleum, the combination of an inclosed compartment provided with an air-opening; a disinfecting apparatus located adjacent to such opening; and a tube leading from such apparatus to the exterior of the compartment, whereby disinfecting material may be supplied to said apparatus from said exterior.

17. In a mausoleum, the combination with a suitable floor; side and end walls; a plurality of superimposed rows of inclosed receiving crypts; a roof forming an air-space above the latter; said walls being removed a distance from the crypts such as to form an outer vertical air-space; the latter being provided with upper and lower passages communicating directly with the atmosphere, and being cut off from communication with said first-named air-space.

18. In a mausoleum, the combination of a suitable supporting floor; side and end walls; a plurality of superimposed tiers of inclosed receiving crypts; a roof forming an air-space above the latter; said walls being removed a distance from the crypts such as to form an outer vertical air-space, the latter being closed at the top; air-inlets at the bottom of such air-space and communicating with the atmosphere; and air-outlets at the top of such air-space and below such closure also communicating with the atmosphere.

Signed by us, this 27 day of December, 1909.

JAMES B. KING.
WILLIAM E. HUGHES.

Attested by—
AGNES LYNCH,
JAMES L. SLADE.

Signed by me, this 24th day of December, 1909.

FRANK W. HALL.

Attested by—
HARVEY S. DURAND,
ALEX WATSON.